United States Patent
Wallach

(10) Patent No.: US 11,720,367 B2
(45) Date of Patent: Aug. 8, 2023

(54) SECURING CONDITIONAL SPECULATIVE INSTRUCTION EXECUTION

(71) Applicant: Micron Technology, Inc., Boise, ID (US)

(72) Inventor: Steven Jeffrey Wallach, Dallas, TX (US)

(*) Notice: Subject to any disclaimer, the term of this patent is extended or adjusted under 35 U.S.C. 154(b) by 0 days.

(21) Appl. No.: 17/707,278

(22) Filed: Mar. 29, 2022

(65) Prior Publication Data

US 2022/0222078 A1 Jul. 14, 2022

Related U.S. Application Data

(63) Continuation of application No. 16/942,591, filed on Jul. 29, 2020, now Pat. No. 11,307,861, which is a continuation of application No. 16/028,750, filed on Jul. 6, 2018, now Pat. No. 10,761,855.

(60) Provisional application No. 62/665,743, filed on May 2, 2018.

(51) Int. Cl.
*G06F 9/38* (2018.01)
*G06F 9/30* (2018.01)

(52) U.S. Cl.
CPC ........ *G06F 9/3844* (2013.01); *G06F 9/30058* (2013.01)

(58) Field of Classification Search
None
See application file for complete search history.

(56) References Cited

U.S. PATENT DOCUMENTS

| | | | |
|---|---|---|---|
| 4,445,177 A | 4/1984 | Bratt et al. | |
| 4,454,579 A | 6/1984 | Pilat et al. | |
| 4,514,800 A | 4/1985 | Gruner et al. | |
| 4,525,780 A | 6/1985 | Bratt et al. | |
| 4,660,142 A | 4/1987 | Clancy et al. | |
| 4,821,184 A | 4/1989 | Clancy et al. | |
| 5,197,136 A * | 3/1993 | Kimura ............... | G06F 9/3804 712/E9.056 |
| 5,226,161 A | 7/1993 | Khoyi et al. | |
| 7,366,882 B2 | 4/2008 | Sahraoui et al. | |
| 8,862,861 B2 | 10/2014 | Olson et al. | |
| 9,798,873 B2 | 10/2017 | Glew et al. | |
| 9,886,532 B1 * | 2/2018 | Scallon ............... | G06F 30/20 |
| 10,761,855 B2 | 9/2020 | Wallach | |
| 11,275,587 B2 | 3/2022 | Wallach | |
| 11,307,861 B2 | 4/2022 | Wallach | |
| 2002/0031135 A1 | 3/2002 | Inoue | |

(Continued)

OTHER PUBLICATIONS

Zeldovich, N. et al., Hardware Enforcement of Application Security Policies Using Tagged Memory, 2008, OSDI, vol. 8, 8th Usenix symposium pp. 225-240, (Year: 2008).*

(Continued)

*Primary Examiner* — Eric Coleman
(74) *Attorney, Agent, or Firm* — Greenberg Traurig

(57) ABSTRACT

A method performed in a processor, includes: receiving, in the processor, a branch instruction in the processing; determining, by the processor, an address of an instruction after the branch instruction as a candidate for speculative execution, the address including an object identification and an offset; and determining, by the processor, whether or not to perform speculative execution of the instruction after the branch instruction based on the object identification of the address.

20 Claims, 4 Drawing Sheets

(56) References Cited

U.S. PATENT DOCUMENTS

| | | | |
|---|---|---|---|
| 2002/0174327 A1* | 11/2002 | Kruckemyer | G06F 9/30054 712/E9.075 |
| 2002/0174328 A1* | 11/2002 | Kruckemyer | G06F 9/3859 712/E9.05 |
| 2003/0033344 A1 | 2/2003 | Abbott et al. | |
| 2004/0103213 A1 | 5/2004 | Park | |
| 2006/0095895 A1 | 5/2006 | K. | |
| 2006/0224816 A1 | 10/2006 | Yamada et al. | |
| 2007/0043531 A1 | 2/2007 | Kosche et al. | |
| 2008/0229069 A1 | 9/2008 | Sartorius et al. | |
| 2008/0250216 A1 | 10/2008 | Kershaw et al. | |
| 2009/0222816 A1 | 9/2009 | Mansell et al. | |
| 2009/0327613 A1* | 12/2009 | Nutter | G06F 12/0875 711/141 |
| 2010/0118734 A1 | 5/2010 | Weilnau, Jr. et al. | |
| 2011/0161618 A1 | 6/2011 | Bellows et al. | |
| 2011/0320759 A1 | 12/2011 | Craddock et al. | |
| 2012/0079254 A1 | 3/2012 | Williams et al. | |
| 2013/0326193 A1 | 12/2013 | Mccarthy et al. | |
| 2013/0339691 A1 | 12/2013 | Bonanno et al. | |
| 2014/0025770 A1 | 1/2014 | Warfield et al. | |
| 2014/0181480 A1 | 6/2014 | Diestelhorst et al. | |
| 2015/0242212 A1 | 8/2015 | Sudhakar et al. | |
| 2015/0277867 A1 | 10/2015 | Hasabnis et al. | |
| 2015/0370560 A1* | 12/2015 | Tan | G06F 21/6209 717/148 |
| 2015/0370561 A1 | 12/2015 | Stark | |
| 2016/0364172 A1 | 12/2016 | Frank et al. | |
| 2016/0371496 A1 | 12/2016 | Sell | |
| 2017/0091444 A1 | 3/2017 | Woodward et al. | |
| 2017/0199815 A1* | 7/2017 | Frank | G06F 3/067 |
| 2018/0113811 A1 | 4/2018 | Xing | |
| 2018/0191671 A1 | 7/2018 | Choi et al. | |
| 2018/0365438 A1 | 12/2018 | Bhattacharyya et al. | |
| 2019/0303162 A1* | 10/2019 | Wilkerson | G06F 9/3004 |
| 2019/0339974 A1 | 11/2019 | Wallach | |
| 2019/0339977 A1 | 11/2019 | Wallach | |
| 2020/0356374 A1 | 11/2020 | Wallach | |
| 2022/0197648 A1 | 6/2022 | Wallach | |

OTHER PUBLICATIONS

"Branch Predictor", https://en.wikipedia.org/wiki/Branch_predictor, printed on Apr. 30, 2018, 12 pages.
Chen, et al. "Control Flow Obfuscation with Information Flow Tracking," ACM, 2009.
Jann Horn, "Project Zero: Reading privileged memory with a side-channel", Jan. 3, 2018.
Mark D. Hill, "On the Meltdown & Spectre Design Flaws", Feb. 2018.
Memory address register, Wikipedia, printed on Jun. 26, 2018.
Memory address, Wikipedia, printed on Jun. 26, 2018.
Program counter, Wikipedia, printed on Jun. 26, 2018.
Speculative execution, Wikipedia, printed on Jun. 27, 2018.
Steve Wallach, "128-Bit Addressing in RISC-V and Security", 5th RISC-V Workshop Proceedings, Nov. 2016.
The RISC-V Instruction Set Manual, vol. II: Privileged Architecture, May 7, 2017.
The RISC-V Instruction Set Manual, vol. I: User-Level ISA, May 7, 2017.
Wolczko, et al. "The influence of the Object-Oriented Language Model on a Supporting Architecture," Kluwer Academic Publishers, 1994.
Securing Conditional Speculative Instruction Execution, U.S. Appl. No. 16/028,750, filed Jul. 6, 2018, Steven Wallach, Patented Case, Dec. 19, 2019.
Securing Conditional Speculative Instruction, U.S. Appl. No. 16/942,591, filed Jul. 29, 2020, Steven Wallach, Publications—Issue Fee Payment Verified, Aug. 16, 2021.
Static Identifications in Object-based Memory Access, U.S. Appl. No. 16/028,840, filed Jul. 6, 2018, Steven Wallach, Patented Case, May 26, 2021.
Static Identifications in Object-based Memory Access, U.S. Appl. No. 17/693,240, filed Mar. 11, 2022, Steven Wallach, Application Undergoing Preexam Processing, Mar. 11, 2022.

* cited by examiner

SECURING CONDITIONAL SPECULATIVE INSTRUCTION EXECUTION

RELATED APPLICATIONS

The present application is a continuation application of U.S. patent application Ser. No. 16/942,591 filed Jul. 29, 2020, which is a continuation application of U.S. patent application Ser. No. 16/028,750 filed Jul. 6, 2018 and issued as U.S. Pat. No. 10,761,855 on Sep. 1, 2020, which claims priority to Prov. U.S. Pat. App. Ser. No. 62/665,743 filed May 2, 2018, the entire disclosures of which applications are hereby incorporated herein by reference.

The present application relates to U.S. patent application Ser. No. 16/028,840, filed Jul. 6, 2018, issued as U.S. Pat. No. 11,275,587 on Mar. 15, 2022, and entitled "Static Identifications in Object-based Memory Access", the entire disclosures of which applications are hereby incorporated herein by reference.

TECHNICAL FIELD

At least some embodiments disclosed herein relate generally to computer architecture and more specifically, but not limited to, conditional speculative instruction execution in computer processors.

BACKGROUND

A memory address in a computing system identifies a memory location in the computing system. Memory addresses are fixed-length sequences of digits conventionally displayed and manipulated as unsigned integers. The length of the sequences of digits or bits can be considered the width of the memory addresses. Memory addresses can be used in certain structures of central processing units (CPUs), such as instruction pointers (or program counters) and memory address registers. The size or width of such structures of a CPU typically determines the length of memory addresses used in such a CPU.

Speculative execution is a computing technique where a processor executes one or more instructions based on the speculation that such instructions need to be executed under some conditions, before the determination result is available as to whether such instructions should be executed or not. Speculative execution can lead to security vulnerabilities, such as Meltdown and Spectre that were made public in 2018.

BRIEF DESCRIPTION OF THE DRAWINGS

The embodiments are illustrated by way of example and not limitation in the figures of the accompanying drawings in which like references indicate similar elements.

DETAILED DESCRIPTION

The present disclosure includes the techniques of using static object identification numbers in addresses of a predetermined width (e.g., 128-bit) for an instruction set (e.g., 128-bit instructions) to represent certain types of objects, such as kernel objects, objects using addresses of a smaller width (e.g., 64-bit, 32-bit) that are generated and/or used by other instruction sets (e.g., 64-bit instructions, 32-bit instructions), etc. In general, the addresses of the predetermined width (e.g., 128-bit) can be generated using various instruction sets (e.g., 128-bit instructions, 64-bit instructions, 32-bit instructions) in various processors that can use such instruction sets to generate and/or use addresses of the predetermined width (e.g., 128-bit). Thus, the predetermined width (e.g., 128-bit) is not limited to a particular type of instruction sets and/or instructions of a particular width.

The present disclosure further includes the techniques of using object identification numbers in memory addresses to secure conditional speculative instruction execution. For example, when a static object identification number of a memory address identifies a kernel object of an operating system, a processor can avoid speculative execution into the kernel object and thus increase the security of the computing system and prevent potential security threats that attack the kernel of the operating system via speculative execution. For example, when the object identification number of a memory address associated with a subsequent instruction to be executed on speculation is different from the object identification number associated with a prior instruction executed before the subsequent instruction, the processor can abort the attempt to perform speculative execution of the subsequent instruction for improved security.

Figure 1:
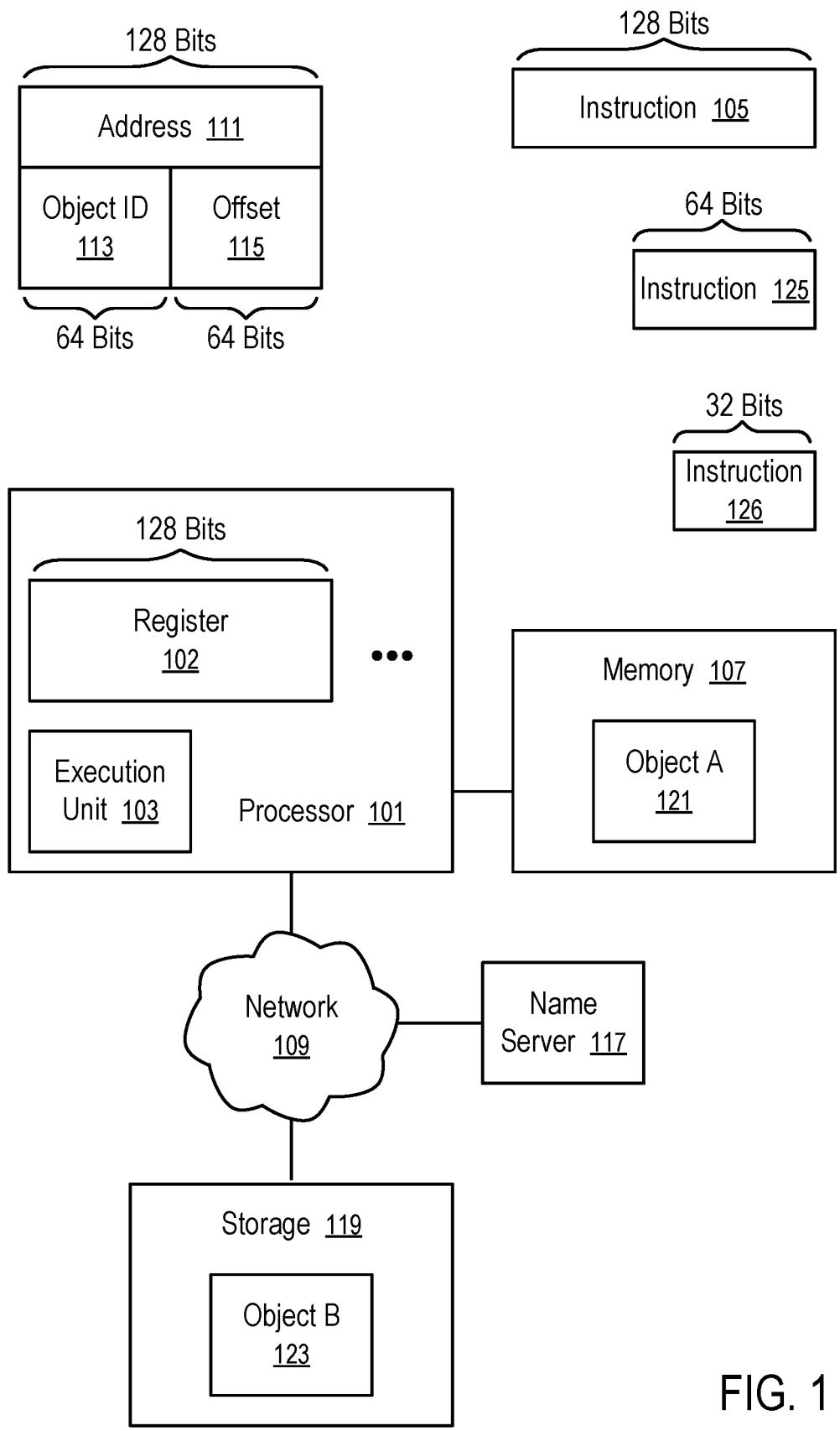
FIG. 1 shows a computer system using an address system according to one embodiment.

FIG. 1 shows a computer system using an address system according to one embodiment.

In FIG. 1, a processor (101) (e.g., a microprocessor or CPU) has an execution unit (103) to perform operations of instructions (e.g., 105) programmed according to one or more instruction sets that can generate 128-bit virtual memory addresses (e.g., 128-bit instruction set).

An example of the 128-bit instruction set is RV128 of RISC-V instruction set identified by the RISC-V Foundation.

The processor (101) is configured with registers (e.g., 102) of a predetermined width, such as 128 bits. The processor (101) can fetch an instruction (105) of the predetermined width, and use an execution unit (103) to perform operations on data provided in the instruction (105) and/or data provided in one or more registers (e.g., 102) identified in the instruction (105), and when applicable, store the result of the operations identified by the instruction (105) in a register identified in the instruction (105).

The registers (e.g., 102) can include a memory register of the predetermined width (e.g., 128 bits) and/or an instruction pointer (or program counter) of the predetermined width (e.g., 128 bits).

For example, an instruction can be coded according to the predetermined specification of an instruction set to perform integer computation (e.g., add, or, xor), to perform control transfer (e.g., jump, branch), to load data/instructions from memory at a memory location specified using an address (e.g., 111) of the predetermined width, or to store data at a memory location specified using an address (e.g., 111) of the predetermined width (e.g., 128 bits).

For example, the address (111) can be used to identify a memory location storing an instruction in the computer system; and the address (111) can be placed in an instruction pointer (or program counter) to identify the instruction to be executed by the processor (101).

For example, the address (111) can be used to identify a memory location storing a data item in the computer system;

and the address (111) can be placed in a memory register to identify the data to be operated upon by the processor (101) in executing an instruction.

Typically, a 128-bit instruction set can address a 128-bit address space. Similarly, a 64-bit instruction set can address a 64-bit address space; and a 32-bit instruction set can address a 32-bit address space.

In some instances, a 64-bit instruction (e.g., 125) (or a 32-bit instruction (e.g., 126)) can also generate and/or use a 128-bit address (e.g., 111). For example, when a 128-bit address is stored in an address register (e.g., 102), the 64-bit instruction (125) (or a 32-bit instruction (126)) executed in the processor (101) (and/or another processor) can operate upon or use the 128-bit address (111) and/or generate another 128-bit address. Thus, the width of memory addresses is not necessarily limited by the width of instructions that generate or use the memory addresses.

In the computer system illustrated in FIG. 1, a 128-bit address (111) is configured to include two portions: a 64-bit object ID (113) and a 64-bit offset (115) relative to the object identified by the object ID (113). For example, the offset (115) can be a byte offset.

The 64-bit offset (115) can be used for indexing, such as program counter, stack pointer, for loading data and/or instruction from a memory location or for storing data at the location. The memory location can be in a main memory (107) connected to the processor (101) via one communication channel (e.g., a memory bus), or a storage (119) connected to the processor via another communication channel (e.g., over a network 109).

FIG. 1 illustrates an example structure for a 128-bit address. Other size choices can be implemented to have the structure of an object ID (113) and an offset (113) relative to the object identified by the object ID. For example, the width of the address can be different from 128 bits. For example, the object ID (113) and the offset (115) can be configured to have different numbers of bits.

In general, the 128-bit address system illustrated in FIG. 1 can be configured to be independent from instruction set architecture such that different vendors of different processors (e.g., 101) having different instruction sets can use the same address system. The memory access request made using the address (128) can be routed in a computer system over memory buses, input/output buses, and/or network (109) like routing internet protocol (IP) packets. Preferably, the association between a memory/storage location and the address (111) is persistent across time and space.

In response to an instruction (105, 125 or 126), the processor (101) can access a data item identified by the 128-bit memory address (111) stored in a register (102). The object ID (113) of the address (111) is usable to identify an object having a distinct name. Such an object can be a software or hardware structure with a name controlled, allocated, issued, and/or registered by a centralized name server (117). The name server (117) can be coupled to the processor (101) via a computer network (109); and the object (e.g., 121 or 123) represented by the object ID (113) can be in the memory (107) that is coupled to the processor (101) via a memory bus, or in a storage (119) that is coupled to the processor (101) via the network (109), or in memory coupled to another processor on the network (109).

An object identified by an object ID (113) in the address (111) can be used to specify location and protection mechanisms, language specific/architecture attributes, such as partitioned global address space (PGAS) node, data encrypted, and/or blockchain.

The object ID (113) of the corresponding object (121 or 123) can be created or allocated using the name server (117) for the entire computer system connected by the network (109), which can include the Internet.

Preferably, the address space using addresses (e.g., 111) in the format illustrated in FIG. 1 is unique over time and space. Any computer supporting the address space is addressable on the network (109) by the name server (117).

When a processor (101) is accessing an object for the first time, the access can require verification of permission to access (e.g., download an executable file, access an entry in an Access Control List (ACL)), and verification of access privileges for the object (e.g., read, write, execute, access through a protected sub-object, execution domain). Execution domain can be identified via classifications of the levels of users (e.g., gold, platinum, executive platinum) and admin level (e.g., 1, 2, . . . , n).

Figure 2:
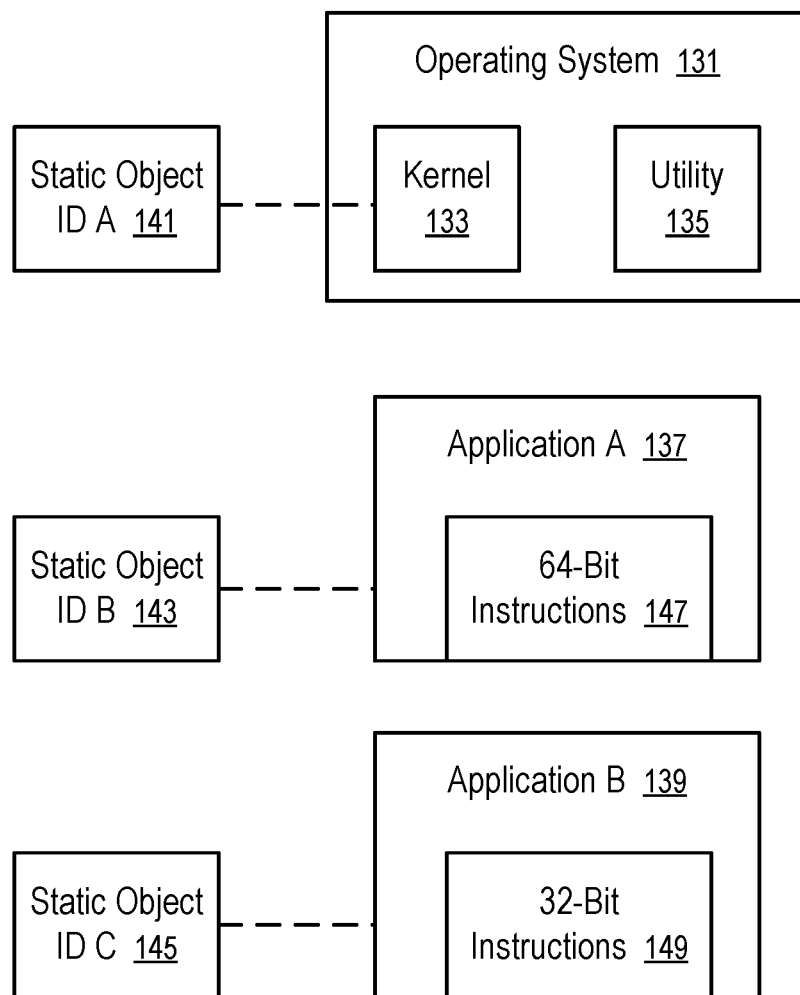
FIG. 2 shows static object identifications in an address system of FIG. 1.

Certain static object IDs can be used to identify predetermined object types or object spaces, as illustrated in FIG. 2.

FIG. 2 shows static object identifications in an address system of FIG. 1.

For example, an object ID (141) having a predetermined value of zero (0) can be used to identify any kernel object (133) of an operating system (131); and the object ID (141) can be static for kernel objects (e.g., 133) across all the nodes in the computer system, regardless of the location of the kernel object (133) in the computer system. The operating system (131) can have utilities (e.g., 135) are not part of the kernel (133).

For example, an object ID (143) having a predetermined value of one (1) can be used to identify any object of an application (137) programmed using 64-bit instructions (143); and the object ID (143) can be static for 64-bit instruction objects (e.g., 137) across all the nodes in the computer system, regardless of the location of the 64-bit instruction object (137) in the computer system.

For example, an object ID (145) having a predetermined value of two (2) can be used to identify any object of an application (139) programmed using 32-bit instructions (147); and the object ID (145) can be static for 32-bit instruction objects (e.g., 139) across all the nodes in the computer system, regardless of the location of the 32-bit instruction object (139) in the computer system.

The static object IDs (141, 143, and/or 145) provide predetermined information about the objects accessed via the memory addresses (e.g., 111) having the static object IDs (141, 143, and/or 145).

For example, when the processor (101) accesses a memory location using the address (111) where the object ID (113) is the static object ID (141), the processor (101) can determine that the data or instruction stored in the memory location is for a kernel object (133) of an operating system (131). Thus, the processor (101) can adjust its operations (e.g., priority level, security level) based on the information that the accessed memory is for an operating system kernel (133).

Similarly, when the processor (101) accesses a memory location using the address (111) where the object ID (113) is the static object ID (143 or 145), the processor (101) can determine that the data or instruction stored in the memory location is for a 64-bit application (137) or a 32-bit application (139). Thus, the processor (101) can adjust its operations to optimize performances, priority and/or security for the application.

In general, static object IDs (e.g., 141, 143, and/or 145) can be used to provide the processor (101) with predetermined information about the objects referenced by the memory address (111) containing the static object IDs (e.g., 141, 143, and/or 145), without a need to contact the name server (117) to look up the property of the objects (e.g., 121 or 123). Thus, the computer system and/or the processor (101) can use the predetermined information in efficiently processing the data and/or instruction fetched using the address (111) that contains the static object IDs (e.g., 141, 143, or 145). For example, a static ID can be used to identify a partitioned global address space (PGAS) address of a predetermined width (e.g., 128-bit or 64 bit), a version of internet protocol addresses (e.g., Internet Protocol version 6 (IPv6)), a unique ID, etc. For example, a static ID can be used to indicate whether the object is a user object, a kernel object of an operating system (OS), or a non-kernel portion of an OS/server object. For example, a static ID can be used to indicate whether a system call is invoked, whether a call to the non-kernel portion of an OS/server is invoked, or whether a call to the kernel of an OS is invoked. In some instances, an address can have more than one static object ID encoded therein according to a predetermined scheme. For example, the static object IDs can be provided in an address without being limited to a particular 64-bit field of the address.

Figure 3:
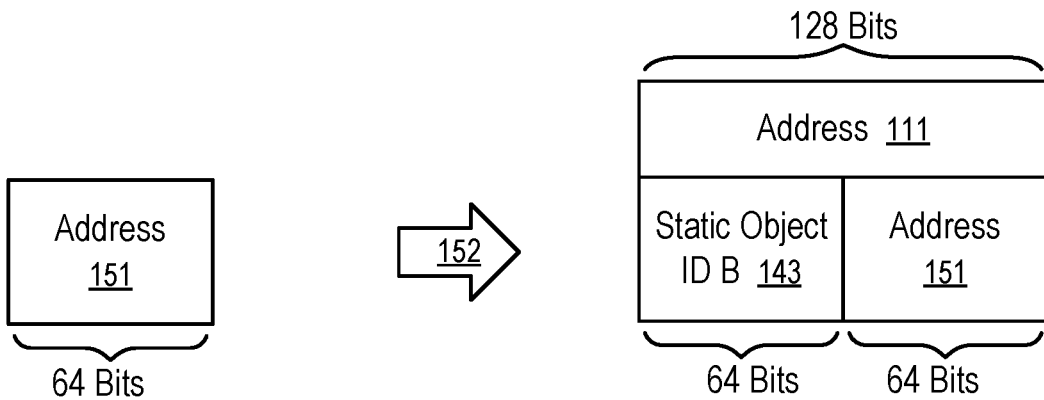
FIGS. 3 and 4 illustrate the use of static object identifications to map addresses of different address spaces.
Figure 4:
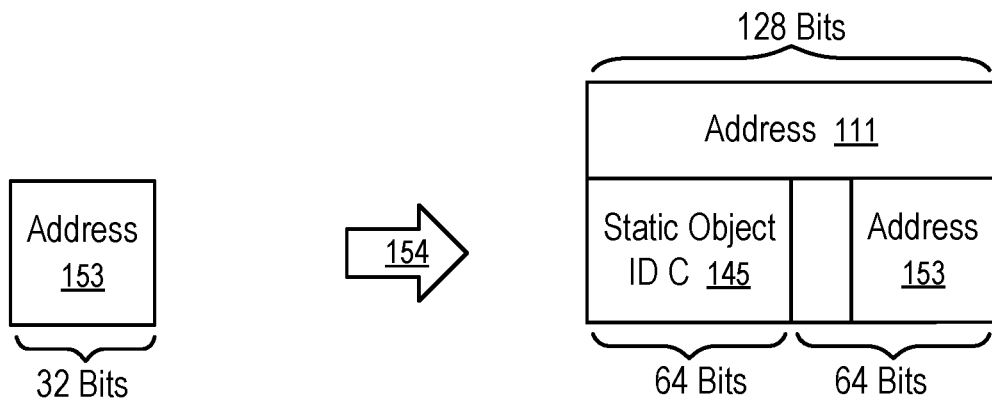

FIGS. 3 and 4 illustrate the use of static object identifications to map addresses of different address spaces.

Using the static object identifications (143 and 145), a computing system can automatically map the 64-bit address space and the 32-bit address space to the 128-bit address space according to predetermined rules. The conversion rule allows a 128-bit processor to run 64-bit applications and 32-bit applications.

For example, a 64-bit address (151) used by an application (137) programmed using 64-bit instructions (147) can be converted to a 128-bit address using the predetermined object ID (143) (e.g., a predetermined value of one (1)) for 64-bit objects, and using the 64-bit address (151) as the offset (115) in the 128-bit address (111), as illustrated in FIG. 3.

For example, a 32-bit address (153) used by an application (139) programmed using 32-bit instructions (149) can be converted to a 128-bit address using the predetermined object ID (145) (e.g., a predetermined value of two (2)) for 32-bit objects, and using the 32-bit address (153) as the offset (115) in the 128-bit address (111), as illustrated in FIG. 4.

Information provided by object identifications can be used to improve security operations of the computing system.

For example, speculative instruction execution has caused security threats in computer systems implemented using certain microprocessors, as documented by the Project Zero team at Google in the webpage at googleprojectzero.blogspot.com/2018/01/reading-privileged-memory-with-side.html, which is hereby incorporated herein by reference.

The present disclosure includes techniques of using object identification numbers in memory addresses to improve security in relation with conditional speculative instruction execution.

For example, when the processor (101) reaches a branch instruction, the processor (101) can determine whether or not to perform speculative execution of the instructions after the branch instruction based on the inspection of object ID of the instructions after the branch instruction.

For example, if the memory address associated with an instruction after the branch instruction has a static object ID (141) that represents a kernel (133) of the operating system (131), the processor (101) can prevent the speculative execution of the instructions after the branch instruction.

For example, if a memory address associated with an instruction after the branch instruction references an object different from the current object, such as the object identified by a memory address associated the branch instruction (or an instruction executed before the branch instruction), the processor (101) can prevent speculative execution of the instruction after the branch instruction.

Figure 5:
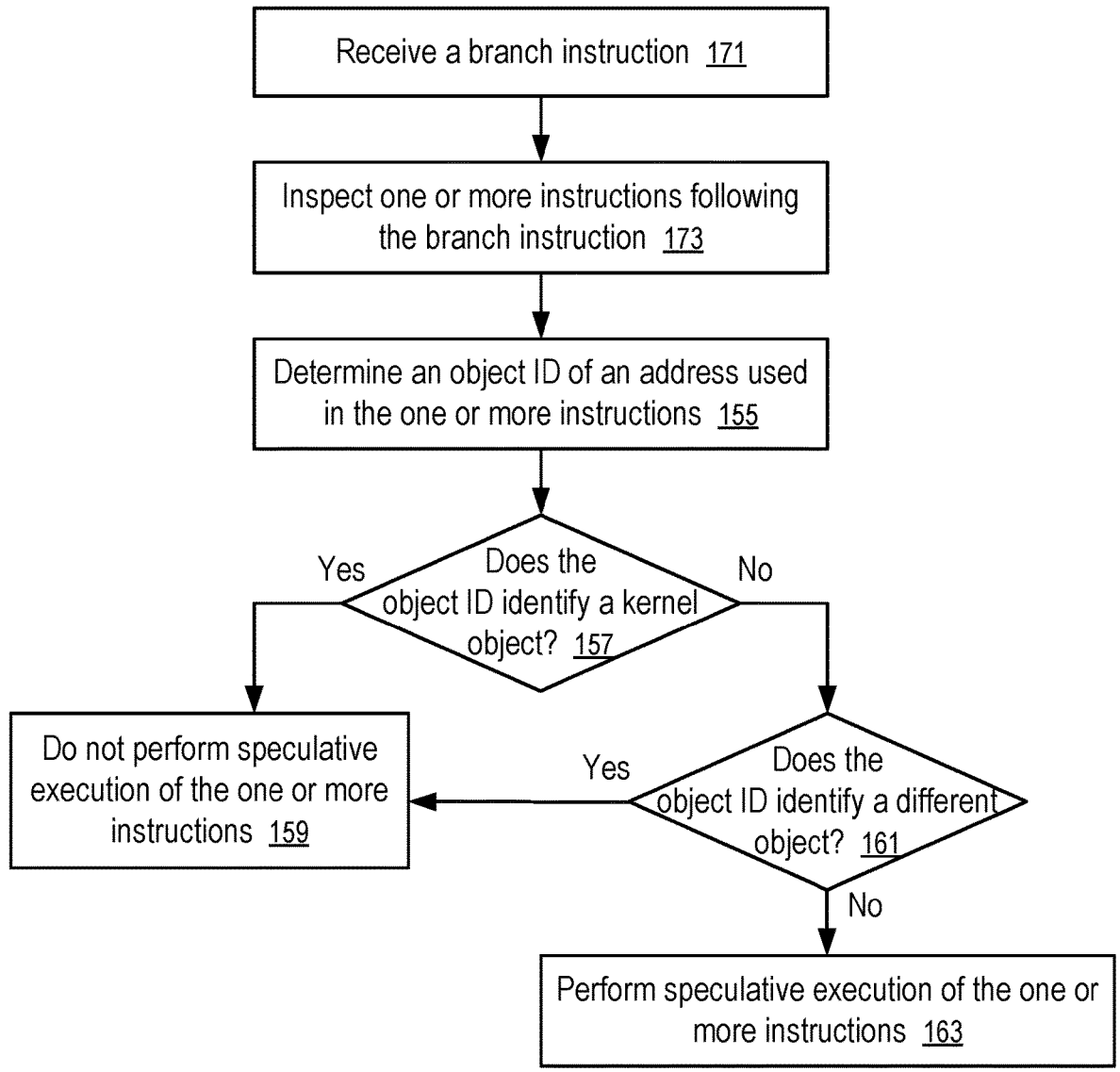
FIG. 5 shows a method to use object identifications in memory addresses to secure conditional speculative instruction execution.

FIG. 5 shows a method to use object identifications in addresses to secure conditional speculative instruction execution. The method of FIG. 5 can be implemented in a computing system of FIG. 1.

Conditional speculative instruction execution involves the execution of one or more second instructions before the results of one or more first instructions are available. When available, the results of one or more first instructions may allow the execution of the one or more second instructions, or prevent the execution of the execution of the one or more second instructions. Thus, the execution of the one or more second instructions before the results of one or more first instructions are available is speculative. If the results of one or more first instructions allow the execution of the one or more second instructions, the results of the speculative execution of the one or more second instructions can be used, which accelerate the execution of the instructions. If the results of one or more first instructions prevent the execution of the one or more second instructions, the results of the speculative execution of the one or more second instructions are discarded.

Conditional speculative instruction execution may cause security vulnerabilities. The method of FIG. 5 can improve the security of the computing system in relation with conditional speculative instruction execution.

The method of FIG. 5 includes: receiving (171) a branch instruction (or similarly a subroutine call); inspecting (173) one or more instructions following the branch instruction; determining (155) an object ID (113) of an address (111) used in the one or more instructions; and determining whether (157) the object ID identifies a kernel object.

For example, in a computer system where a static object ID (141) (e.g., a predetermined value of zero (0)) is used to identify a kernel object (133), the processor (101) can determine whether (157) the object ID identify a kernel object by comparing the object ID to the static object ID (141) (e.g., a predetermined value of zero (0)).

If (157) the object ID of an address (111) used in the one or more instructions following the branch instruction identifies a kernel object (and the current object is not a kernel object), the processor does not (159) perform speculative execution of the one or more instructions. Such an arrangement prevents attacks on the kernel of an operating system made using conditional speculative instruction execution.

Otherwise (157), the method of FIG. 5 further includes determine whether (161) the object ID identify a different object. If the object referenced by the object ID of an address (111) used in the one or more instructions following the branch instruction is different from the current object from which the branching is performed, there is a security risk; and thus, the processor (101) does not (159) perform speculative execution of the one or more instructions. In general, when the processor (101) executes a sequence of instructions in speculation that change from being addressed as one object to another object, a mediation operation can be performed to determine whether there is a security risk.

Otherwise (161), the processor (101) can be permitted to perform (163) speculative execution of the one or more instructions.

Thus, the processor (101) can prevent, avoid, or skip speculative executions into a kernel (133) of an operating system (131) and/or speculative executions into a different object (121) from a current object (123).

The method of FIG. 5 can be used to secure speculative instruction execution involving a subroutine call. Further, other conditions formulated based on object ID (e.g., static object ID) can be used to preclude speculation.

The techniques disclosed herein can be applied to at least to computer systems where processors are separated from memory and processors communicate with memory and storage devices via communication buses and/or computer networks. Further, the techniques disclosed herein can be applied to computer systems in which processing capabilities are integrated within memory/storage. For example, the processing circuits, including executing units and/or registers of a typical processor, can be implemented within the integrated circuits and/or the integrated circuit packages of memory media to perform processing within a memory device. Thus, a processor (e.g., 101) as discussed above and illustrated in the drawings is not necessarily a central processing unit in the von Neumann architecture. The processor can be a unit integrated within memory to overcome the von Neumann bottleneck that limits computing performance as a result of a limit in throughput caused by latency in data moves between a central processing unit and memory configured separately according to the von Neumann architecture.

The description and drawings of the present disclosure are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications can be made thereto without departing from the broader spirit and scope as set forth in the following claims. The specification and drawings are, accordingly, to be regarded in an illustrative sense rather than a restrictive sense.

What is claimed is:

1. A device, comprising:
   a microprocessor, having:
   a register configured to store a memory address having a portion identifying a first object; and
   an execution unit configured to execute a branch instruction using the memory address in the register, wherein whether the branch instruction is allowed to be executed in the execution unit is based on the portion identifying the first object.

2. The device of claim 1, comprising:
   a memory configured to store the first object represented by the portion identifying the first object;
   wherein the memory address further has a portion identifying an offset of an instruction in the first object.

3. The device of claim 2, wherein the memory address has 128 bits.

4. The device of claim 2, wherein the portion identifying the first object has 64 bits.

5. The device of claim 2, wherein the portion identifying the offset has 64 bits.

6. The device of claim 1, wherein the memory address identifies a subsequent instruction to be executed in response to execution of the branch instruction.

7. The device of claim 6, wherein the microprocessor is configured to:
   determine whether the first object is a kernel of an operating system; and
   in response to a determination that the first object is the kernel of the operating system, prevent execution of the subsequent instruction.

8. The device of claim 7, wherein the kernel of the operating system is represented by a predetermined number in a memory address.

9. The device of claim 8, wherein the predetermined number is zero.

10. The device of claim 6, wherein the microprocessor is configured to:
    determine whether the first object is different from a second object associated with the branch instruction; and
    in response to a determination that the first object is different from the second object, prevent execution of the subsequent instruction.

11. A method, comprising:
    storing, in a memory, a first object;
    storing, by a microprocessor, into a register a memory address having a portion identifying the first object;
    executing, by an execution unit of the microprocessor, a branch instruction using the memory address in the register; and
    determining, by the microprocessor, whether the branch instruction is allowed to be executed in the execution unit based on the portion identifying the first object.

12. The method of claim 11, wherein the memory address further has a portion identifying an offset of an instruction in the first object.

13. The method of claim 12, wherein the portion identifying the first object has 64 bits.

14. The method of claim 12, wherein the portion identifying the offset has 64 bits.

15. The method of claim 11, wherein the memory address identifies a subsequent instruction to be executed in response to execution of the branch instruction.

16. The method of claim 15, further comprising:
    determining whether the first object is a kernel of an operating system; and
    preventing, in response to a determination that the first object is the kernel of the operating system, execution of the subsequent instruction.

17. The method of claim 15, further comprising:
    determining whether the first object is different from a second object associated with the branch instruction; and
    preventing, in response to a determination that the first object is different from the second object, execution of the subsequent instruction.

18. A microprocessor, comprising:
    a register configured to store a memory address;
    an execution unit configured to execute a branch instruction configured to use the memory address in the register;
    wherein the memory address has a first portion and a second portion, the first portion configured to identify an object, the second portion configured to identify an offset of a subsequent instruction stored in the object for execution as a result of executing the branch instruction; and wherein the microprocessor is configured to determine, based on the first portion, whether to allow execution of the subsequent instruction as the result of executing the branch instruction.

19. The microprocessor of claim 18, wherein the microprocessor is configured to prevent execution of the subsequent instruction in response to a determination that the object is a kernel of an operating system.

20. The microprocessor of claim 18, wherein the microprocessor is configured to prevent execution of the subsequent instruction in response to a determination that the object is different from an object associated with the branch instruction.

* * * * *